US005092408A

United States Patent [19]

Tatara et al.

[11] Patent Number: 5,092,408

[45] Date of Patent: * Mar. 3, 1992

[54] CONTROL DEVICE FOR A DUAL FUNCTION MACHINE

[75] Inventors: André Tatara, Naperville, Ill.; Jose Andiano, Lury-sur-Arnon, France; Robert McCraig, Basingstoke, England

[73] Assignee: Case Corporation, Racine, Wis.

[ * ] Notice: The portion of the term of this patent subsequent to Jun. 19, 2007 has been disclaimed.

[21] Appl. No.: 512,923

[22] Filed: Apr. 23, 1990

Related U.S. Application Data

[63] Continuation of Ser. No. 396,385, Aug. 21, 1989, Pat. No. 4,934,462.

[30] Foreign Application Priority Data

Nov. 21, 1988 [FR] France ............................... 88-15125

[51] Int. Cl.[5] ........................... E02F 9/24; B60N 2/14

[52] U.S. Cl. ....................................... 172/2; 180/331; 37/DIG. 1; 172/435

[58] Field of Search ........................... 172/2, 431, 435; 180/326, 329, 330, 331; 37/DIG. 3, DIG. 1, 117.5

[56] References Cited

U.S. PATENT DOCUMENTS 4,026,379 5/1977 Dunn et al. ......................... 180/331
4,372,341 2/1983 Crowley ......................... 180/326 X
4,730,691 3/1988 Grigg ............................. 180/326 X

FOREIGN PATENT DOCUMENTS 1211494 2/1966 Fed. Rep. of Germany ...... 180/331
2546832 4/1977 Fed. Rep. of Germany ...... 180/330
2705980 8/1978 German Democratic Rep. .................................. 180/330
251530 10/1988 Japan ............................. 37/DIG. 1

*Primary Examiner*—Randolph A. Reese
*Assistant Examiner*—Jeffrey L. Thompson
*Attorney, Agent, or Firm*—Jansson & Shupe, Ltd.

[57] ABSTRACT

A control device for use in a dual function machine includes a first disconnecting device for connection between a first operator's control knob and at least one control valve usable for controlling a first function of the machine. A second disconnecting device is provided for connection between a second operator's control knob and at least one second control valve usable for controlling a second function of the machine. The disconnecting devices are arranged for mounting in actuating relationship to a swivel-type operator's seat, the first disconnecting device being actuated for disabling the second function when said seat is in a first position for operating the first function and the second disconnecting device being actuated for disabling the first function when the seat is in a second position for operating the second function.

20 Claims, 1 Drawing Sheet

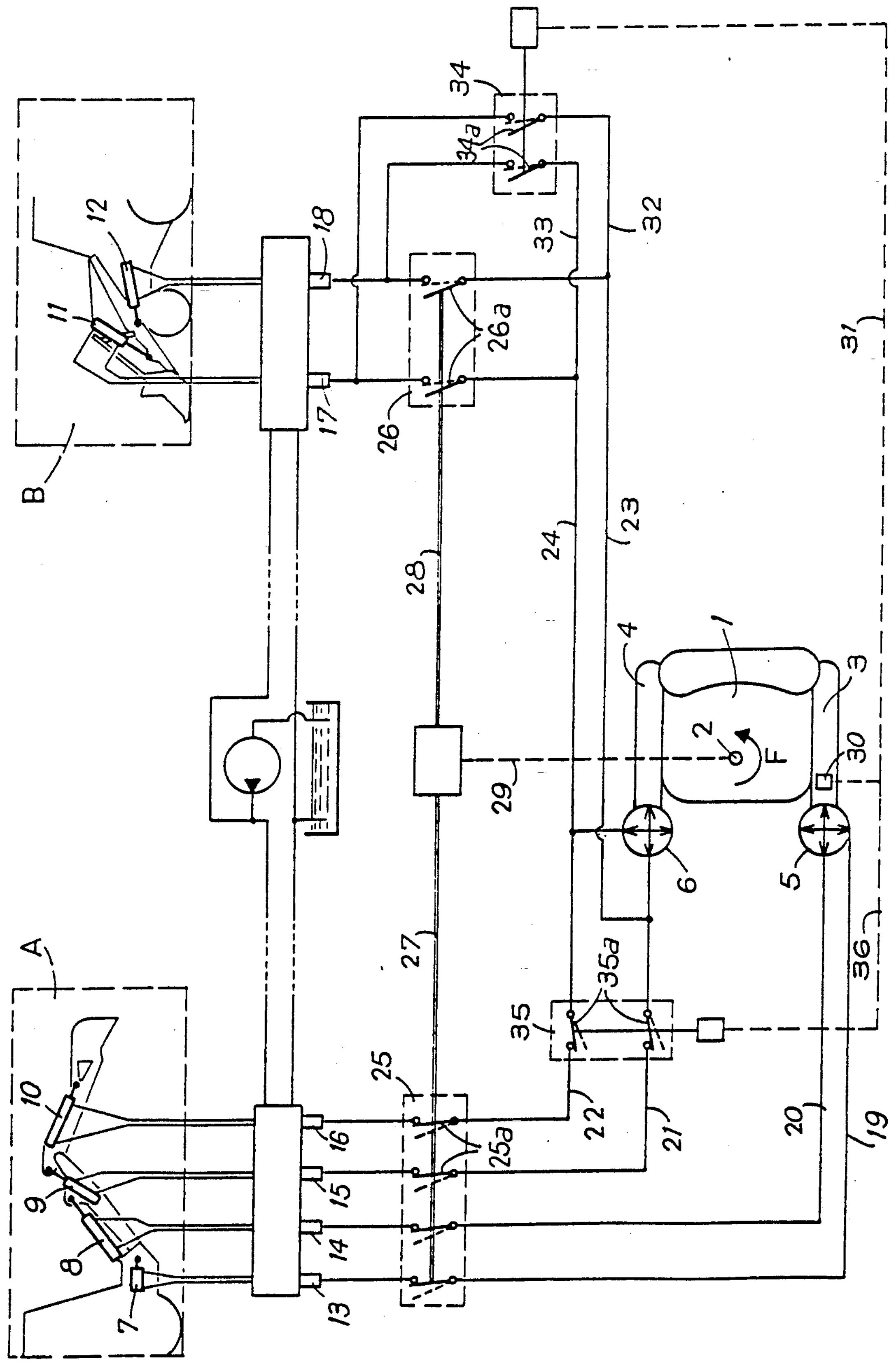
A
B
1
2
F
3
4
5
6
7
8
9
10
11
12
13
14
15
16
17
18
19
20
21
22
23
24
25
25a
26
26a
27
28
29
30
31
32
33
34
34a
35
35a
36

CONTROL DEVICE FOR A DUAL FUNCTION MACHINE

RELATED APPLICATION

This application is a continuation of application Serial No. 07/396,385, now U.S. Pat. No. 4,934,462 issued June 19, 1990, which was filed on Aug. 21, 1989 and which claims priority from French patent application Ser. No. 88-15125 filed in France on Nov. 21, 1988.

FIELD OF THE INVENTION

This invention is related generally to machine control devices which are sensitive to an operator's position and, more particularly, to a control device for use on a dual function machine on which the device may enable or disable a particular machine function depending on the position of a swiveling operator's seat.

BACKGROUND OF THE INVENTION

Certain types of machinery employ a single operator but are equipped to perform at least two, and perhaps more, separate functions. These functions may be for the same overall purpose, e.g. the fabrication of a part, construction of a building, or installation of an underground pipeline but each function of the machine is employed for a different purpose to achieve the overall end. Such machines often have different items of functional equipment disposed at different locations thereon with the operator selecting appropriate controls by changing body position, often by moving from position to position in a swivel-type operator seat. To prevent inadvertent operation of the actuating controls for an item of machine equipment which is not then in use, there is a need for a control device which permits the operation of each of the various equipment items according to the position of the operator's seat. While this invention will have application for multiple function machines generally, it is described particularly with respect to an item of construction machinery.

Excavator vehicles, commonly known as "mechanical shovels", are known which include two sets of earth-moving equipment, both of which are hydraulically controlled from a single control position. In general, these sets of equipment are disposed at opposite longitudinal ends of the vehicle chassis, which is also provided with driving and/or steerable wheels. One of these equipments, namely a digger or backhoe is used in particular for digging trenches, and the vehicle must be held in a stationary position in order for said equipment to be used. In contrast, the equipment at the other end, namely a loader or shovel per se requires the operator to drive the vehicle while it is in use since materials picked up in the shovel are subsequently tipped into a truck for removal.

The control position on the vehicle is therefore equipped with two groups of controls, each corresponding to one of the sets of equipment, and the operator sits on a swivelling seat mounted on a platform of the vehicle.

In each of its extreme positions, the swivelling seat gives the operator easy access to the corresponding group of controls, and in particular the operator has access to the vehicle steering wheel when the shovel is in use. When using the shovel, the shovel equipment must be capable of being controlled by one hand only so as to leave the other hand free to steer the vehicle.

It is also recalled that in this type of vehicle the various elements constituting either of the sets of equipment are actuated by means of at least one hydraulic actuator under the control of a control valve which is in turn servo-controlled to the position of a knob disposed within reach of the operator when sitting in the control position.

The term "knob" is used herein to designate any kind of manually-operated lever, handle, pushbutton, etc. It is also used to cover a set of such devices, and a typical example would be in the form of a "joystick" providing independent positive and negative control effects for forward and reverse movement of the stick and for left and right movement of the stick.

Other excavator vehicles, which may be referred to as "mechanical diggers", have a turret supporting a single set of earth-moving equipment, with the turret being pivotally mounted on a chassis provided with displacement means, e.g. wheels or crawler tracks. In this case, the vehicle control position is disposed on the pivoting turret and the operator generally has remote-control knobs both for controlling the earth-moving equipment and for controlling vehicle displacement.

OBJECTS OF THE INVENTION

It is an object of this invention to overcome some of the problems and shortcomings of the prior art.

Another object of this invention is to provide a control device for selectively enabling and disabling portions of a multi-function machine.

Another object of this invention is to provide a control device whereby functions of a machine may be selectively enabled or disabled depending upon the position of an operator's seat.

Still another object of the invention is to provide a control device which is useful for multi-function earth-moving and excavating equipment.

Yet another object of the invention is to provide a control device which may be adapted to control systems of the electrical, hydraulic or pneumatic type. How these and other objects are accomplished will become apparent from the detailed description taken in conjunction with the drawing.

SUMMARY OF THE INVENTION

A control device for use in a dual function machine includes a first disconnecting device for connection between a first operator's control knob and at least one control valve usable for controlling a first function of the machine. A second disconnecting device is provided for connection between a second operator's control knob and at least one second control valve usable for controlling a second function of the machine. The disconnecting devices are arranged for mounting in actuating relationship to a swivel-type operator's seat, the first disconnecting device being actuated for disabling the second function when said seat is in a first position for operating the first function and the second disconnecting device being actuated for disabling the first function when the seat is in a second position for operating the second function.

It should immediately be underlined that the control path may be of the electrical type, of the hydraulic type, or of the pneumatic type, since in each case it serves solely to control, i.e. open partially or totally, the valves which control the actuators. The actuators themselves are powered by hydraulic fluid under high pressure and the flow rate of the hydraulic fluid is adjusted by the amount the control valves are opened.

The transmission paths are thus either electrical cables or else ducts conveying a control fluid, and the control valves themselves are either electrically-controlled valves or else valves which are opened under hydraulic or pneumatic control.

Under such conditions, the on/off switch disposed in each transmission is constituted either by a multi-pole electrical switch whose moving contacts are caused to move together with the swivelling portion of the operator's seat, or else by a slide valve where the slide moves as a function of the position of the operator's seat and completely opens or closes the ducts connecting the knobs to the control valves.

The invention will be better understood and its advantages and various secondary characteristics will appear more clearly from reading the following description of a preferred embodiment in which transmission is provided electrically. It should nevertheless be understood that the invention is not limited to this type of transmission and the person skilled in the art will easily transpose the characteristics of an electrical transmission to a hydraulic or a pneumatic transmission.

BRIEF DESCRIPTION OF THE DRAWINGS

FIG. 1 is a schematic diagram of a control device of the invention.

DETAILED DESCRIPTIONS OF PREFERRED EMBODIMENTS

With reference to FIGURE 1, it can be seen that the control position includes a seat 1 which is pivotally mounted on the platform of an excavator vehicle which includes two sets of earth-moving equipment which are represented diagrammatically by overall references A and B. The seat 1 is facing equipment A which is of the "digger" or "backhoe" type, but it can readily be swivelled to face equipment B which is of the "loader" or "shovel" type, by rotating through 180° in the direction of arrow F about a pivot axis 2. Remote control knobs 5 and 6 are disposed at the ends of the arms 3 and 4 of the seat 1. Under conditions described in greater detail below, these remote-control knobs serve to control the various elements of each of the sets A and B of earth-moving equipment, i.e. hydraulic actuators 7, 8, 9, and 10 in equipment A and actuators 11 and 12 in equipment B. Each of these actuators is powered by hydraulic fluid under pressure, respectively via control valves 13, 14, 15, and 16 for equipment A, and via control valves 17 and 18 for equipment B. Each of these control valves is opened, optionally progressively, under the control of the operator manipulating the remote control knobs 5 and 6.

To this end, an appropriate means of transmitting a control signal is provided between each knob and the control valves, with the transmitting means being electrical in this case and with the valves 13 to 18 being electrically-controlled valves.

Electrical paths 19 and 20 connect the electrically-controlled valves 13 and 14 of equipment A to knob 5, and similarly paths 21 and 22 connect valves 15 and 16 also of equipment A and knob 6. Knob 6 is additionally connected to the electrically controlled valves 17 and 18 of equipment B via electrical paths 23 and 24.

Thus, there is one group of paths made up of paths 19 through 22 corresponding to equipment A and a second group of paths made up of paths 23 and 24 corresponding to equipment B. Each of these groups includes an on/off switch of the multi-pole type, with the switch corresponding to equipment A being given an overall reference 25 and the switch corresponding to the equipment B being given an overall reference 26. The moving electrical switching elements of the switch 25, i.e. its set of moving contacts 25*a*, is coupled to a rod 27 or the like, and the moving contracts 26*a* of the switch 26 are coupled to a control rod 28. The two moving members 27 and 28 are themselves controlled as a function of the position of the swivelling portion of the seat 1. More precisely, and as shown in the drawing, the moving contacts 25*a* provide continuity in paths 19, 20, 21, and 22 when the seat 1 is in its extreme position corresponding to using equipment A. Under such conditions, the moving contacts 26*b* are open, thereby preventing the valves 17 and 18 of the equipment B from being controlled.

In contrast, if the seat 1 swivels in the direction of arrow F in order to take up its other extreme position corresponding to using equipment B, then the sets of moving contacts 25*a* and 26*a* are caused to take up their positions shown in dashed lines in the drawing under the control of their moving actuator members 27 and 28 which are moved by control line 29 so as to follow the position of the seat 1. In this second position of the moving contacts 25*a* and 26*a*, equipment A can no longer be used.

In this respect, it will be observed that when the seat 1 is in its position shown in FIGURE 1, both knobs 5 and 6 are used by the operator for controlling the various elements of equipment A. However, when the seat 1 is in the appropriate position for controlling equipment B, only the knob 6 is connected to the electrical control valves 17 and 18 of the equipment, while knob 5 is completely disconnected. As a result, the operators's left hand is available for the other controls of the vehicle, and in particular for steering it. This is particularly advantageous when equipment B is, as shown, constituted by a mechanical shovel.

It is already mentioned above that paths 21 and 22 of equipment A and paths 23 and 24 of equipment B are connected to the same knob 6. In order to facilitate utilization of the vehicle, it is advantageous of the paths 19, 20, 21, 22, 23, 24 of the two sets of equipment which are connected to the same knob to correspond to analogous or identical elements in each of the two sets of equipment. For example, it may be observed that paths 22 and 24 for controlling electrically-controlled valves 16 and 17 are connected to knob 6 and that in both sets of equipment they correspond to similar items, namely the earth-engaging shovel or bucket.

Provision is also made for at least one of the sets of equipment A and B to be usable even if the seat 1 is not in one of its extreme positions. With reference to FIG. 1, this means that equipment A, for example, may be used not only when the seat 1 is in its position corresponding to the extreme position shown in the drawing, but also when it is in an intermediate position between said extreme position and the other extreme position corresponding to that employed when using equipment B. In the example shown, these two extreme positions are about 180° apart, but this value is not essential.

In practice, the mechanical members included in the control line 29 serve to predetermine, for at least one of the sets of equipment, a position of the seat 1 beyond which said equipment can be used. With respect to equipment A, it is advantageous for this predetermined position to be very close to the extreme position corresponding to normal operating conditions for equipment B. In other words, the seat 1 may be swivelled through at least 150° from its position shown in the drawing before control line 29 causes the moving contacts 25*a* and 26*a* to switch positions from the position shown in solid lines to the position shown in dashed lines.

To put it yet another way, once the seat 1 is in a extreme position to operate one set of equipment, equipment A for example, the seat 1 must be rotated through an arc of at least 150° before the positions of contacts 25*a*, 26*a* are switched to permit operation of equipment B. Such rotation would bring the seat I to within no more than 30° of the extreme position to operate equipment B. Conversely and if the seat 1 is in the extreme position to operate equipment B, it must be rotated at least 150° before equipment A can be operated. Such rotation would bring the seat 1 to within n more than 30° of the extreme position to operate equipment A.

In some cases, the switchover could occur as soon as the seat 1 leaves its extreme position which corresponds to using equipment B to take up a position shown in solid lines in the drawing.

Finally, it should be appreciated that when the seat 1 is in one or other of its extreme positions, e.g. the position shown in FIG. 1 which corresponds to normal utilization of equipment A, it may be advantageous, in an exceptional circumstance, to be able to make use of equipment B.

To this end, an auxiliary control 30 is provided (preferably on one of the arm of the seat 1) serving to bridge the effect of paths 23 and 24 being opened, e.g. by means of a transmission shown in diagrammatically at 31. Each of paths 23 and 24 includes a bypass line 32 or 33 connected to bypass switch 26. The bypass lines 32 and 33 have an auxiliary switch 34 connected therein with its moving contacts 34*a* normally being in an open position as shown by solid lines in the drawing. When the auxiliary control 30 is actuated, the moving contacts 34*a* take up the position shown in dashed lines, thereby bridging across open contacts 26*a* and making it possible to use equipment B under the control of knob 6.

Naturally, it is possible to prevent elements of equipment A being controlled simultaneously by the knob 6 during such exceptional utilization of equipment B. To this end, the paths 21 and 22 may be provided with a secondary switch 35 whose moving contacts 35*a* are normally in the closed position, but are moved to the open position as shown by dashed lines whenever the operator actuates the auxiliary control 30. A secondary transmission 36 is provided between the control 30 and the secondary switch 35.

While only a few of the embodiments of the invention have been shown and described, it is not intended to be limited thereby.

We claim:

1. A control device for use in a machine having a swivel-type operator's seat mounted for movement between first and second positions and first and second equipment mounted on such machine, each such equipment being powered by at least one hydraulic cylinder, the control device including:

- a first switch for selectively permitting the operation of the first equipment;
- a second switch for selectively permitting the operation of the second equipment;
- the first and second switches being actuated substantially simultaneously in accordance with the position of such seat, the second equipment being disabled when the first equipment is operated and the first equipment being disabled when the second equipment is operated.

2. The control device of claim 1 wherein the first and second switches are actuated so that the first equipment is operative and the second equipment is disabled when the seat is in the first position.

3. The control device of claim 2 wherein the operator's seat may be swivelled through an arc of about 180 degrees and wherein the first switch is actuated for disabling the second equipment when the seat is within no more than 30 degrees of the first position.

4. The control device of claim 3 further including a first control knob operable by a machine operator for controlling the first equipment when the seat is in the first position.

5. The control device of claim 4 further including a second control knob operable by a machine operator for controlling the second equipment when the seat is in the second position.

6. The control device of claim 5 further including an auxiliary control whereby the second equipment may be operated notwithstanding the seat is in the first position.

7. The control device of claim 2 further including an auxiliary control whereby the second equipment may be operated notwithstanding the seat is in the first position.

8. The control device of claim 1 further including first and second control knobs, wherein the first knob and the second knob are operable for controlling the first equipment when the seat is in the first position and wherein the second knob is operable for controlling the second equipment when the seat is in the second position.

9. A control device for a machine having at least first and second sets of equipment disposed thereon, each such set of equipment being operable by at least one hydraulic actuator which is operable by a control valve, the control device including:

- a seat for a machine operator, such seat being mounted to swivel between two positions, the seat having a first control knob provided thereon for operating the first set of equipment by operating a corresponding control valve, the seat further having a second control knob provided thereon for operating the second set of equipment by operating a corresponding control valve;
- a first control path connected between the first knob and a corresponding control valve for operating the first set of equipment;
- a second control path connected between the second control knob and a corresponding control valve for operating the second set of equipment;
- a circuit interruption device connected in the first path and the second path, the interruption device being controlled in accordance with the swivelled position of the seat, to prevent the first and second sets of equipment from being operated simultaneously.

10. A control device according to claim 9, wherein at least one of the control paths is of the electrical type and wherein at least one of control valves is electrically operated.

11. A control device according to claim 10, wherein all of the control valves associated with one of the sets of equipment are of the electrically operated type and wherein all such control valves are electrically connected to a common remote control knob.

12. A control device according to claim 11, wherein both of the control knobs are active when the seat is in the first position and wherein one of the control knobs is inactive when the seat is in the second position.

13. A control device according to claim 9 wherein at least one of the control paths is of the pneumatic type and wherein at least one of the control valves is of the pneumatically operated type.

14. A control device according to claim 9 wherein at least one of the control paths is of the hydraulic type and wherein at least one of the control valves is of the hydraulically operated type.

15. A control device for a machine having first and second sets of equipment disposed thereon, each such set of equipment being operable by at least one hydraulic actuator which is operable by a control valve, the control device including:

a seat for a machine operator, such seat being mounted to swivel between two positions, a plurality of electrically-operated first control valves for operating the first set of equipment;

a plurality of electrically-operated second control valves for operating the second set of equipment;

a first control knob and a second control knob, such knobs being linked through a first control path to the first control valves for operating the first set of equipment when the seat is in the first position;

the first control knob being linked through a second control path to the second control valves for operating the second set of equipment when the seat is in the second position;

a first multipole switch interposed in the first control path for selectively opening and closing such first control path;

a second multipole switch interposed in the second control path for selectively opening and closing such second control path;

each such multipole switch being connected to a rod, the position of each rod being dependent upon the swivelled position of the seat, thereby preventing simultaneous closure of the first switch and the second switch.

16. The control device of claim 15 wherein the two sets of equipment include functions which are analogous one to the other and wherein the first control knob is alternately inked to analogous functions for the operation thereof when the seat is moved between the first position and the second position.

17. The control device of claim 16 further including a manually operated auxiliary control whereby the second function is permitted to be operated notwithstanding that the seat is in the first position.

18. The control device of claim 17 wherein the auxiliary control includes a switch which bridges across an open second control path, thereby permitting operation of the second set of equipment notwithstanding that the seat is in the first position, the auxiliary control further including another switch which interrupts circuits in the first control path when the second set of equipment is being operated with the seat in the first position.

19. The control device of claim 15 further including an auxiliary control whereby the second function is permitted to be operated notwithstanding that the seat is in the first position.

20. The control device of claim 19 wherein the auxiliary control includes a switch which bridges across an open second control path, thereby permitting operation of the second set of equipment notwithstanding that the seat is in the first position, the auxiliary control further including another switch which interrupts circuits in the first control path when the second set of equipment is being operated with the seat in the first position.

* * * * *

UNITED STATES PATENT AND TRADEMARK OFFICE
CERTIFICATE OF CORRECTION

PATENT NO. : 5,092,408
DATED : March 3, 1992
INVENTOR(S) : Andre Tatara, Jose Andiano and Robert McCaig

It is certified that error appears in the above-identified patent and that said Letters Patent is hereby corrected as shown below:

On the title page, under the Inventors, delete "McCraig" and insert --McCaig--.

In column 5, line 13, delete "I" and insert --1--.

In column 5, line 18, delete "n" and insert --no--.

Claim 15 is misorganized by improper inclusion of extra subparagraphs and should read as follows:

--15. A control device for a machine having first and second sets of equipment disposed thereon, each such set of equipment being operable by at least one hydraulic actuator which is operable by a control valve, the control device including:

-a seat for a machine operator, such seat being mounted to swivel between two positions,

-a plurality of electrically-operated first control valves for operating the first set of equipment;

-a plurality of electrically-operated second control valves for operating the second set of equipment;

-a first control knob and a second control knob, such knobs being linked through a first control path to the first control valves for operating the first set of equipment when the seat is in the first position;

-the first control knob being linked through a second control path to the second control valves for operating the second set of equipment when the seat is in the second position;

-a first multipole switch interposed in the first control path for selectively opening and closing such first control path;

-a second multipole switch interposed in the second control path for selectively opening and closing such second control path;

UNITED STATES PATENT AND TRADEMARK OFFICE

CERTIFICATE OF CORRECTION

PATENT NO. : 5,092,408

DATED : March 3, 1992

INVENTOR(S) : Andre Tatara, Jose Andiano and Robert McCaig

It is certified that error appears in the above-indentified patent and that said Letters Patent is hereby corrected as shown below:

Cont.- Claim 15 is misorganized by improper inclusion of extra sub-paragraphs and should read as follows:

each such multipole switch being connected to a rod, the position of each rod being dependent upon the swivelled position of the seat, thereby preventing simultaneous closure of the first switch and the second switch.--

Signed and Sealed this

Eighth Day of June, 1993

Attest:

MICHAEL K. KIRK

*Attesting Officer* *Acting Commissioner of Patents and Trademarks*